(12) United States Patent
Klendworth et al.

(10) Patent No.: US 10,358,513 B2
(45) Date of Patent: Jul. 23, 2019

(54) HIGH ACTIVITY ZIEGLER-NATTA CATALYSTS, PROCESS FOR PRODUCING CATALYSTS AND USE THEREOF

(75) Inventors: Douglas D. Klendworth, West Chester, OH (US); Kenneth W. Johnson, West Chester, OH (US); Andreas Winter, Neuleiningen (DE); Franz Langhauser, Ruppertsberg (DE)

(73) Assignee: Lummus Novolen Technology GmbH, Mannheim (DE)

( * ) Notice: Subject to any disclaimer, the term of this patent is extended or adjusted under 35 U.S.C. 154(b) by 99 days.

(21) Appl. No.: 12/482,309

(22) Filed: Jun. 10, 2009

(65) Prior Publication Data
US 2010/0069586 A1  Mar. 18, 2010

Related U.S. Application Data

(60) Provisional application No. 61/060,646, filed on Jun. 11, 2008.

(51) Int. Cl.
*C08F 110/06* (2006.01)
*C08F 4/651* (2006.01)
*C08F 4/643* (2006.01)

(52) U.S. Cl.
CPC ................... *C08F 110/06* (2013.01)

(58) Field of Classification Search
USPC ............... 502/127, 107; 526/124.9
See application file for complete search history.

(56) References Cited

U.S. PATENT DOCUMENTS

| | | | | |
|---|---|---|---|---|
| 4,159,963 A | * | 7/1979 | Sakurai et al. | 502/116 |
| 4,315,999 A | * | 2/1982 | Matsuura et al. | 526/114 |
| 4,399,054 A | | 8/1983 | Ferraris et al. | |
| 4,829,034 A | * | 5/1989 | Iiskolan et al. | 502/9 |
| 5,126,302 A | * | 6/1992 | Masino | C08F 10/00 502/115 |
| 5,137,856 A | | 8/1992 | Koskinen et al. | |
| 5,468,698 A | | 11/1995 | Koskinen et al. | |

(Continued)

FOREIGN PATENT DOCUMENTS

| | | |
|---|---|---|
| EP | 0395083 A2 | 10/1990 |
| JP | 04-180903 B2 | 11/2008 |

(Continued)

OTHER PUBLICATIONS

International Search Report, dated Jul. 24, 2009.

(Continued)

*Primary Examiner* — Fred M Teskin
(74) *Attorney, Agent, or Firm* — Osha Liang LLP

(57) ABSTRACT

Improved Ziegler-Natta catalysts and methods of making the improved catalyst are described. The Ziegler-Natta catalyst is formed using a spherical $MgCl_2$-xROH support, where R is a linear, cyclic or branched hydrocarbon unit with 1-10 carbon atoms and where ROH is an alcohol or a mixture of at least two different alcohols and where x has a range of about 1.5 to 6.0, preferably about 2.5 to 4, more preferably about 2.9 to 3.4, and even more preferably 2.95 to 3.35. The Ziegler-Natta catalyst includes a Group 4-8 transition metal and an internal donor. The catalyst has improved activity in olefin polymerization reactions as well as good stereoregularity and hydrogen sensitivity.

34 Claims, 9 Drawing Sheets

(56) References Cited

U.S. PATENT DOCUMENTS

| | | | |
|---|---|---|---|
| 5,710,229 A | | 1/1998 | Garoff et al. |
| 5,905,050 A | * | 5/1999 | Koshinen ............... C08F 10/00 |
| | | | 502/111 |
| 6,020,279 A | * | 2/2000 | Uwai et al. ...................... 502/9 |
| 6,034,023 A | | 3/2000 | Kersting et al. |
| 6,221,803 B1 | | 4/2001 | Vereecke |
| 6,300,415 B1 | * | 10/2001 | Okayama ............... B32B 27/32 |
| | | | 264/165 |
| 6,339,136 B1 | | 1/2002 | Huikku et al. |
| 7,060,763 B2 | * | 6/2006 | Evangelisti et al. ....... 526/123.1 |
| 2006/0003888 A1 | | 1/2006 | Yang et al. |
| 2006/0046927 A1 | * | 3/2006 | Klendworth ........... C08F 10/00 |
| | | | 502/103 |
| 2006/0063664 A1 | | 3/2006 | Klendworth et al. |
| 2008/0194781 A1 | * | 8/2008 | Vincenzi et al. .......... 526/124.2 |
| 2009/0286942 A1 | * | 11/2009 | Van Pelt ............... C08F 210/16 |
| | | | 526/124.3 |

FOREIGN PATENT DOCUMENTS

| | | | | |
|---|---|---|---|---|
| WO | 97/43321 A1 | 11/1997 | | |
| WO | 98/22514 A1 | 5/1998 | | |
| WO | WO 2005063832 A1 * | 7/2005 | ............. | C07F 3/003 |
| WO | 2006026158 A1 | 3/2006 | | |
| WO | WO 2007147715 A1 * | 12/2007 | ............. | C08F 10/00 |

OTHER PUBLICATIONS

"Magnesium chloride—ethanol adducts" J.C.J. Bart et al.; Journal of Materials Science 30 (1995) 2809-2820; Sep. 27, 1994 (12 pages).
Official action, with translation, dated Apr. 6, 2012 in the corresponding Eurasian application No. 201071434 (2 pages).
Notice of Grounds of Rejection (w/English translation) dated Nov. 26, 2013 in corresponding Japanese application No. 2011-513666 (12 pages).
Office Action dated Dec. 10, 2013 in corresponding Mexican application No. MX/a/2010/013609 (2 pages).
Examination report (w/translation) dated Oct. 22, 2012 in corresponding Taiwan application No. 098119473 (7 pages).
Correspondence reporting First Official Action dated Mar. 12, 2013 in corresponding Colombian application No. 10.151.506 (7 pages).
Office Action (with translation) dated Mar. 25, 2013 in corresponding Chinese application No. 200980121620.8 (9 pages).
Substantive Examination Adverse Report dated Mar. 29, 2013 in corresponding Malaysian application No. PI 2010005901 (3 pages).
Notice of Decision to Refuse (w/translation) dated Mar. 28, 2013 in corresponding Korean application No. 10-2011-7000523 (6 pages).
Office Action dated Aug. 8, 2012 in corresponding Korean application 10-2011-7000523, with translation (13 pages).
Correspondence reporting Official Action dated Jul. 17, 2013 in corresponding Mexican application No. MX/a/2010/013609 (4 pages).
Office Action (with translation) dated Aug. 7, 2013 in corresponding Korean application No. 10-2013-7012899 (6 pages).
First Examination Report dated Jul. 16, 2014 in corresponding Indian patent application No. 8179/DELNP/2010 (4 pages).
Office Action (with translation) dated Oct. 14, 2013 in corresponding Chinese application No. 200980121620.8 (7 pages).
Communication purusuant to Article 94(3) EPC dated Oct. 21, 2013 in corresponding European application No. 09 763 558.5 (7 pages).
Extended European Search report dated Jan. 24, 2013 in corresponding European application No. 09763558.5 (6 pages).
Official action, with translation, dated Nov. 8, 2012 in the corresponding Eurasian application No. 201071434 (2 pages).
Office Action dated Sep. 5, 2012 in corresponding Chinese application No. 200980121620.8 (9 pages).
Rejection Decision (w/translation) dated Oct. 10, 2014 in corresponding Chinese application No. 200980121620.8 (10 pages).
Office Action (with translation) dated Apr. 23, 2014 in corresponding Chinese application No. 200980121620.8 (11 pages).
Correspondence reporting First Official Action dated Jun. 10, 2013 in corresponding Japanese application No. 2011-513666 (10 pages).
Reexamination Notice (w/translation) dated Sep. 2, 2015 in corresponding Chinese application No. 200980121620.8 (17 pages).
Decision of Reexamination dated Mar. 29, 2016 in corresponding Chinese application No. 200980121620.8 (w/ translation) (31 pages).

* cited by examiner

FIG. 3A: 90-micron MgCl$_2$-3.2EtOH support
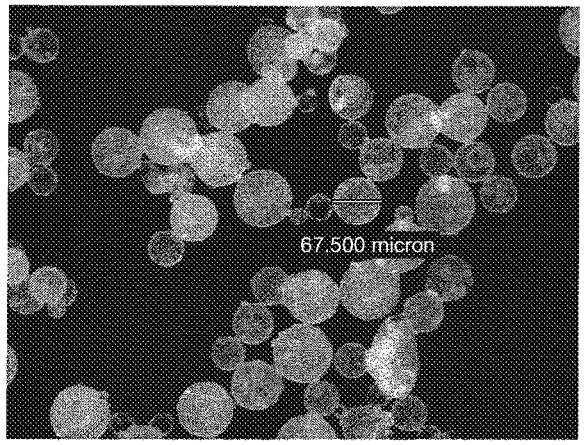
FIG. 3B: 60-micron MgCl$_2$-3.1EtOH support
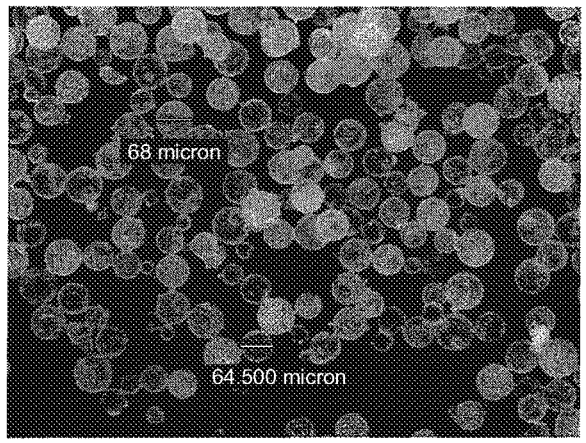
FIG. 3C: 40-micron MgCl$_2$-3.1EtOH support
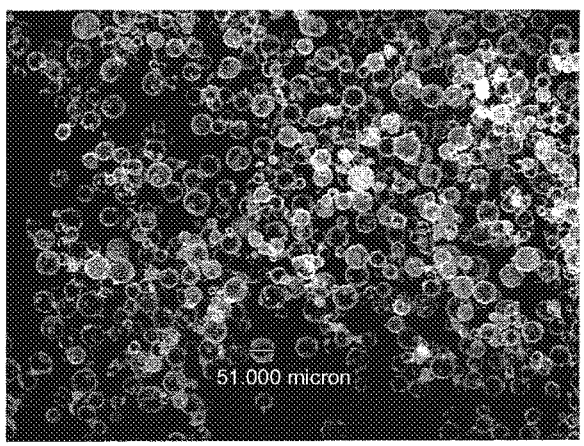

FIG. 4A: Catalyst 78
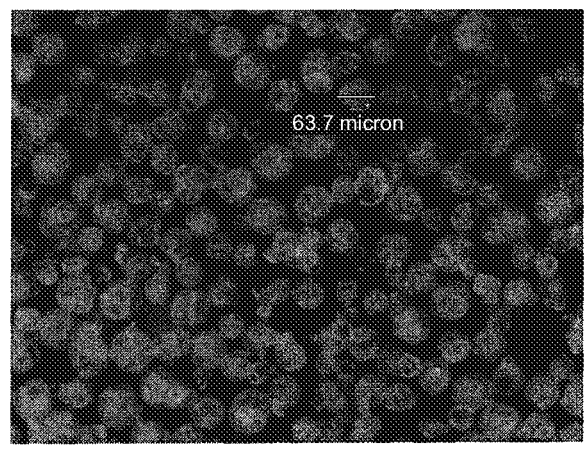
FIG. 4B: Catalyst 95
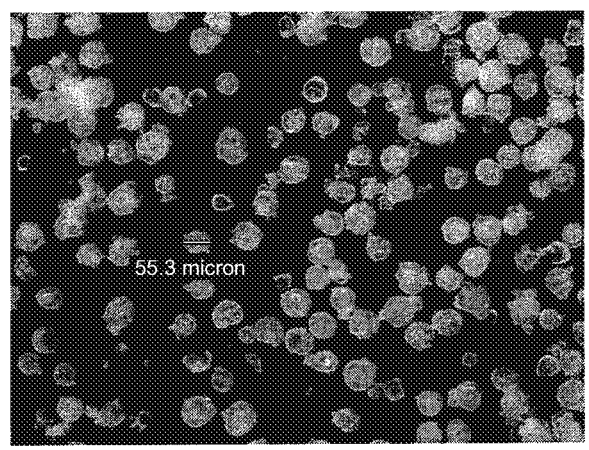

FIG. 4C: Catalyst 105
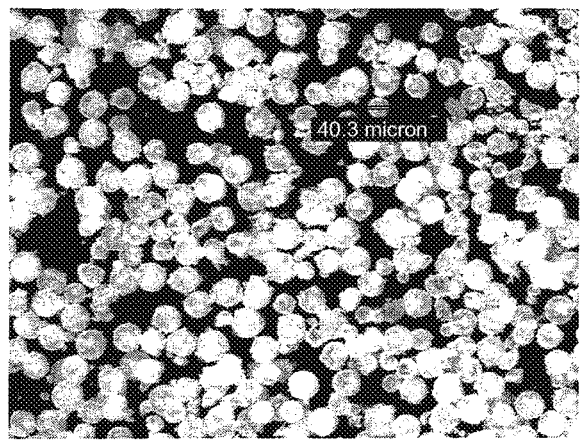
FIG. 4D: Catalyst 107
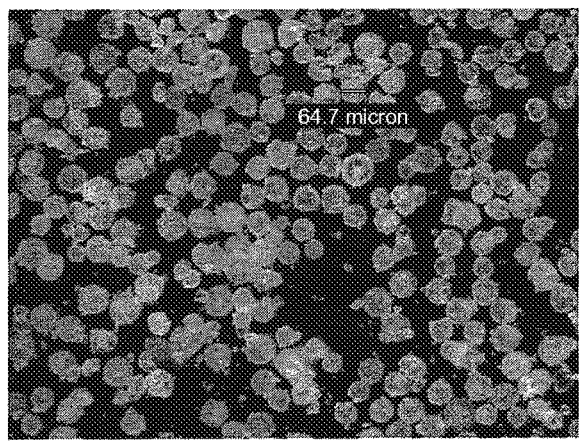
FIG. 4E: Catalyst 20
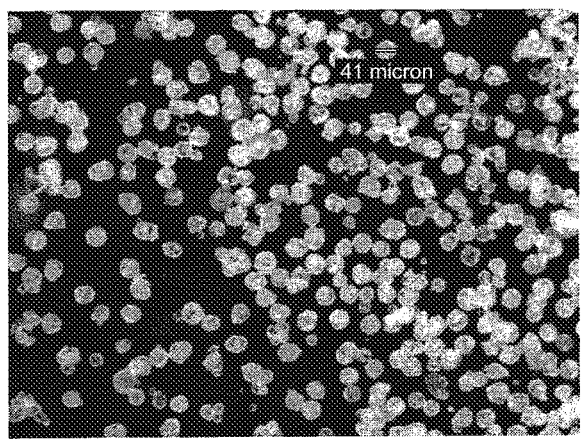

FIG. 4F: Catalyst 137
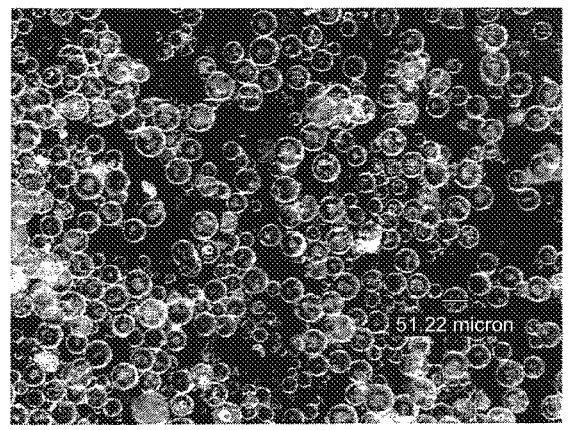
FIG.-4G: Comparative Catalyst 60
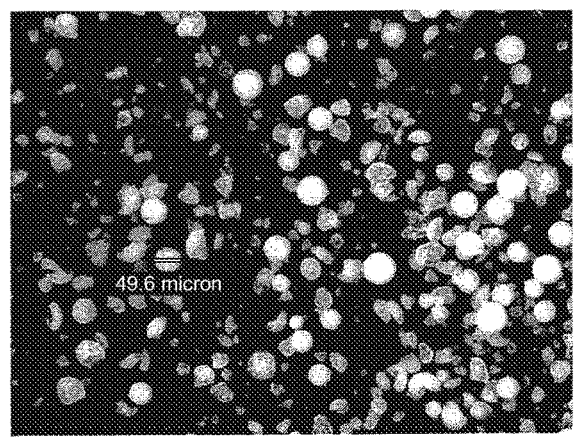
FIG. 4H: Comparative Catalyst 40
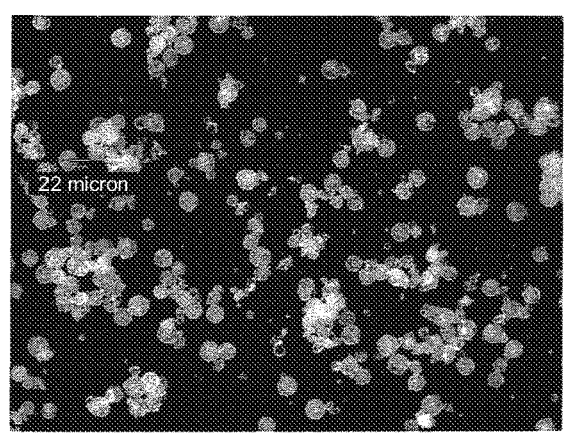

FIG. 5A: Polymer from Catalyst 73 (bulk polymerization)
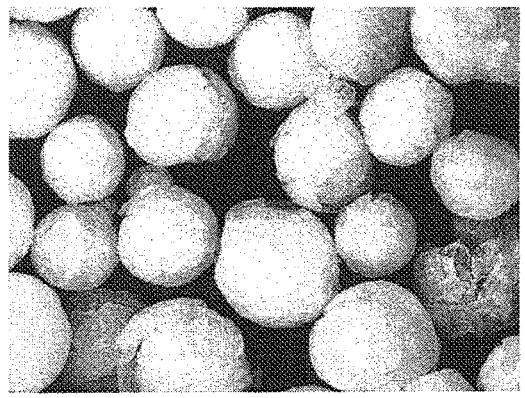
FIG. 5B: Polymer from Catalyst 89 (bulk polymerization)
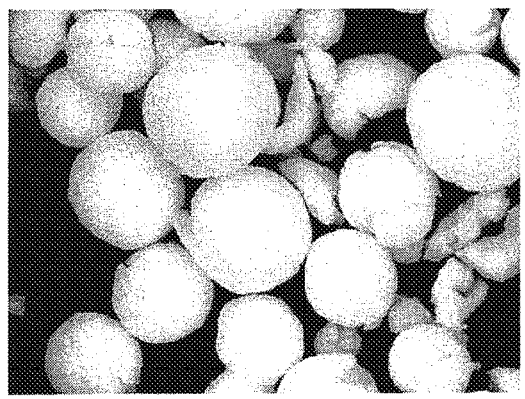
FIG. 5C: Polymer from Catalyst 95 (bulk polymerization)
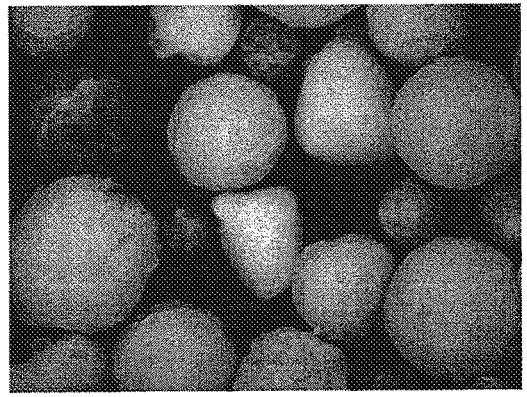

FIG. 5D: Polymer from Catalyst 93 (bulk polymerization)
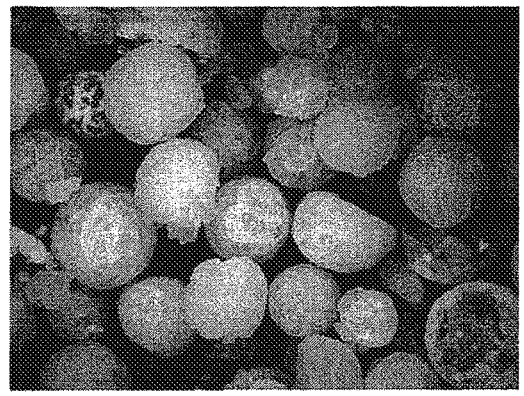
FIG. 5E: Polymer from Catalyst 95 (gas phase polymerization)
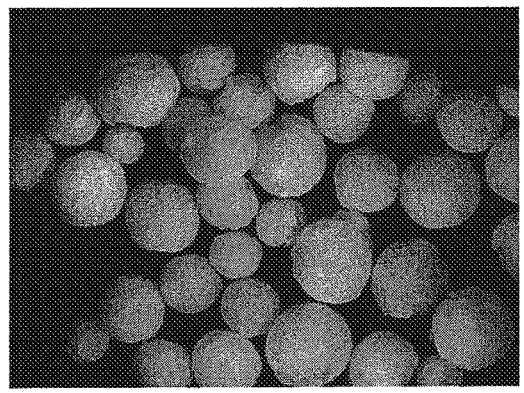
FIG. 5F: Polymer from Catalyst 73 (gas phase polymerization)
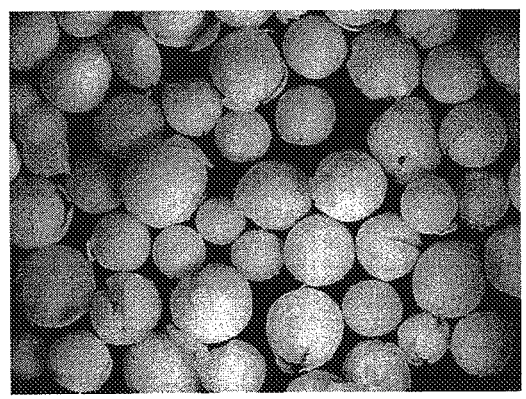

FIG. 5G: Polymer from Catalyst 103 (gas phase polymerization)
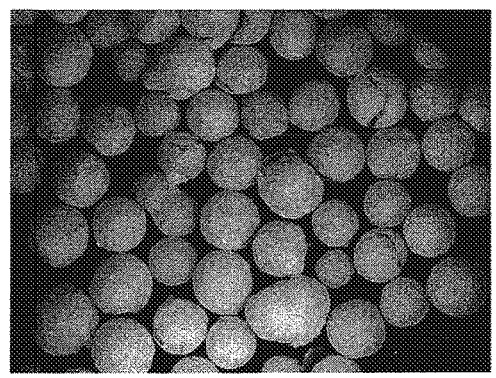
FIG. 5H: Polymer from Catalyst 20 (gas phase polymerization)
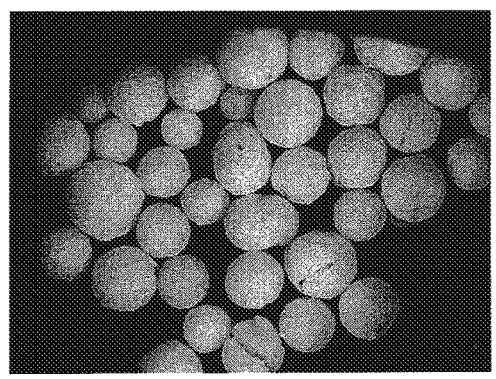
FIG. 5I: Polymer from Comparative Catalyst 60 (bulk polymerization)
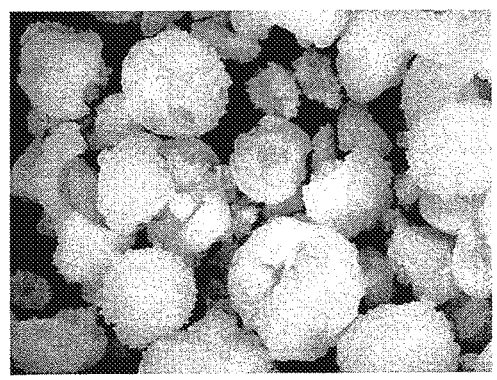

FIG. 5J: Polymer from Comparative Catalyst 40 (bulk polymerization)
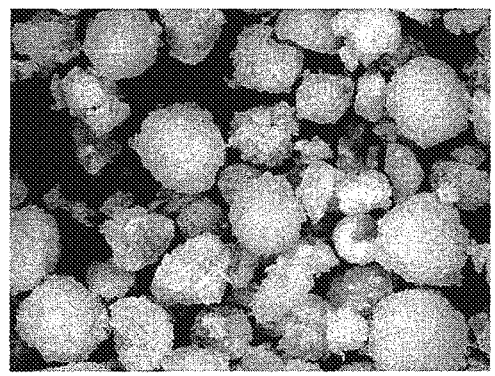

HIGH ACTIVITY ZIEGLER-NATTA CATALYSTS, PROCESS FOR PRODUCING CATALYSTS AND USE THEREOF

PRIORITY CLAIM

The present application claims priority to U.S. Provisional Application Ser. No. 61/060,646 filed on Jun. 11, 2008, the entire contents of which are hereby incorporated by reference.

FIELD OF THE INVENTION

The present invention relates, in one aspect, to an improved Ziegler-Natta catalyst. In particular, the invention relates to the use of such catalyst in the polymerization of olefins to polyolefins, and particularly to an improved method for making a Ziegler-Natta catalyst.

BACKGROUND OF THE INVENTION

Ziegler-Natta catalysts are generally composed of a catalyst support material, a transition metal component and one or more ligands that satisfy the valence of the metal. The transition metal component is typically a Group 4-8 transition metal, with titanium, zirconium, chromium or vanadium being commonly used. The transition metal is often provided as a metal halide, such as $TiCl_4$. Ziegler-Natta catalysts are used to effectively promote the high yield polymerization of olefins. In the polymerization of olefins, the catalyst is used in combination with an organoaluminum cocatalyst.

When used to catalyze polymerization of propylene, a third component may be used in the catalyst. The third component is an electron donor used to control the stereoregularity of the polymer. It can be either incorporated into the catalyst during its synthesis (an internal donor), or it can be added to the polymerization reactor during the polymerization reaction (an external donor). In some reactions, both an internal donor and an external donor may be used. Aromatic esters, diethers, succinates, alkoxysilanes and hindered amines are examples of compounds that may be used in forming polypropylene.

One known support material used in some Ziegler-Natta catalysts is $MgCl_2$. The $MgCl_2$ material is sometimes complexed with ethanol (EtOH). The EtOH reacts with the transition metal halide, such as $TiCl_4$, in preparing the catalyst.

Methods of producing $MgCl_2$-xEtOH complexes, where x is the average number of EtOH molecules in the support material, are described in several patents. For example, U.S. Pat. No. 5,468,698 to Koskinen describes methods for preparing a $MgCl_2$-xEtOH support material. A melt $MgCl_2$-xEtOH complex (x=3.3 to 5.5) is sprayed into a heated chamber to form a particulate $MgCl_2$-xEtOH material in which x=2.0 to 3.2. Koskinen does not describe the composition of any particular catalyst made using the support material.

Catalysts utilizing $MgCl_2$-xEtOH supports are also described. For example, U.S. Pat. No. 4,829,034 to Iiskolan describes a Ziegler-Natta catalyst, and a method for making the catalyst, using a $MgCl_2$-xEtOH support in which x is about 3. In Iiskolan, the support material is first contacted with an internal donor, such as D-i-BP. The support D-i-BP complex is then combined with $TiCl_4$ to form the catalyst.

U.S. Pat. No. 6,020,279 to Uwai describes a method for making a Ziegler-Natta catalyst by producing a $MgCl_2$-xEtOH support in which x=1.5 to 2.1 and the support has an average particle diameter of 91 μm. The support is combined with a titanium halide, such as $TiCl_4$, and an electron donor for 10 minutes to 10 hours at 120° C. to 135° C. in the presence of an aliphatic solvent.

While a variety of Ziegler-Natta catalysts have been developed, due to the importance of olefin polymerizations there remains a need to develop catalysts having improved activity. Improving the activity of the catalyst leads to higher product yields and reduces the quantity of the catalyst required for the olefin polymerization reaction which reduces the catalyst cost and the amount of catalyst impurities in the polymer (reduced ash content) resulting in polymers with a better performance profile.

Regardless of the method used to produce the $MgCl_2$ support, or even if such a support is used in a typically produced Ziegler-Natta catalyst, only the unique method of combining the three essential components of the Ziegler-Natta catalyst as taught in this invention will produce the unusually high activity, hydrogen response and stereo-regulating activity found in the current invention.

SUMMARY OF THE INVENTION

The present invention is directed to an improved Ziegler-Natta catalyst that is formed using an improved procedure combined with a spherical $MgCl_2$-xROH support, where R is a linear, cyclic or branched hydrocarbon unit with 1-10 carbon atoms and where ROH is an alcohol or a mixture of at least two different alcohols, preferably where the ROH is ethanol or a mixture of ethanol and a higher alcohol with R being a linear, cyclic or branched hydrocarbon unit with 3-10 carbon atoms, preferably 4-10 carbon atoms; and where x has a range of about 1.5 to 6.0, preferably about 2.5 to 4, more preferably about 2.9 to 3.4, and even more preferably 2.95 to 3.35.

The catalyst includes a Group 4-8 transition metal, such as Ti, and an internal donor like aromatic esters, diethers, succinates, or hindered amines, preferably dialkylphthalates like di-isobutylphthalate (D-i-BP) or di-n-butylphthalate (D-n-BP). The catalyst of the present invention has improved activity in olefin polymerization reactions as well as good stereoregularity and hydrogen sensitivity.

The present invention is also directed to methods of making the improved Ziegler-Natta catalyst. Generally, spherical $MgCl_2$-xROH (x=3.0-3.3) is treated with a transition metal halide, such as $TiCl_4$, at a low temperature (−10° C. to +10° C.). The reaction product is heated to approximately 50° C. and contacted with the internal donor. The resulting precatalyst is heated to about 105° C. and held at that temperature for a period of time, preferably about 1 to 2 hours. The reaction mixture is cooled to room temperature and the solid catalyst is extracted with an organic solvent/$TiCl_4$ mixture at elevated temperature. The catalyst is washed with a solvent, such as heptane, and vacuum dried.

The improved catalyst of the invention can be used to produce polypropylene or other polymerized olefins. The catalysts of the invention exhibit improved activity, while producing polymers having good stereospecificity and morphology.

BRIEF DESCRIPTION OF THE DRAWINGS

FIGS. 3A-3C show micrographs of MgCl2-xROH supports, FIGS. 4A-4H show micrographs of inventive catalysts and FIGS. 5A-5J show micrographs of the subsequent polymers, respectively. These micrographs show the typical sphericity of the catalysts and polymers produced by the process of this invention unless otherwise noted in the results table.

DETAILED DESCRIPTION

Figure 1:
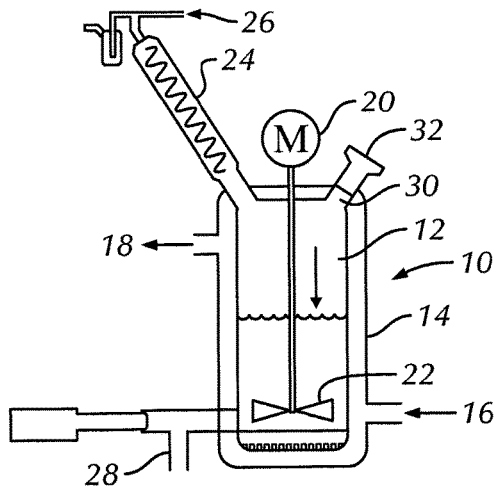
FIG. 1 is a diagram of the equipment used to prepare the sample catalysts of the present invention through the pre-catalyst stage.

The present invention is directed to an improved Ziegler-Natta catalyst that is formed using an improved procedure combined with a spherical $MgCl_2$-xROH support, where R is a linear, cyclic or branched hydrocarbon unit with 1-10 carbon atoms and where ROH is an alcohol or a mixture of at least two different alcohols, preferably where the ROH is ethanol or a mixture of ethanol and a higher alcohol with R being a linear, cyclic or branched hydrocarbon unit with 3-10 carbon atoms, preferably 4-10 carbon atoms; and where x has a range of about 1.5 to 6.0, preferably about 2.5 to 4, more preferably about 2.9 to 3.4, and even more preferably 2.95 to 3.35.

This support material is referred to herein as the "spherical $MgCl_2$ support." The spherical $MgCl_2$ support may have any desired particle size. In preferred embodiments, the spherical $MgCl_2$ support has an average particle size ($d_{50}$) of between about 10 microns to 200 microns, preferably 20 microns and 150 microns, and more preferably between 30 microns to 120 microns, and even more preferably between 40 microns to 90 microns. The spherical $MgCl_2$ support may be produced according to U.S. Pat. No. 4,829,034 to Iiskolan and Koskinen] or U.S. Pat. No. 5,905,050 to Koshinen by spray-cooling of a molten $MgCl_2$-alcohol adduct. Physical characteristics of three preferred solid supports are summarized in Table 1.

TABLE 1

| Diameter (microns) | Mg wt. % | EtOH wt. % | Water wt. % | Malvern (microns) | | | EtOH/$MgCl_2$ |
|---|---|---|---|---|---|---|---|
| | | | | D10 | D50 | D90 | |
| 40 | 9.9 | 57.6 | 0.3 | 27 | 42 | 57 | 3.1 |
| 60 | 9.8 | 58.8 | 0.2 | 47 | 66 | 88 | 3.1 |
| 90 | 9.7 | 59.4 | 0.3 | 67 | 97 | 134 | 3.2 |

The Ziegler-Natta catalyst of the present invention includes a Group 4-8 transition metal, preferably a Group 4-6 transition metal. In preferred embodiments, the catalyst incorporates Ti, Zr, V or Cr, and most preferably Ti. The transition metal is typically provided in a halogenated form, such as a chloride, bromide or iodide. Titanium chloride is particularly preferred.

The Ziegler-Natta catalyst of the present invention is made by contacting the spherical $MgCl_2$ support with the transition metal component in a reactor at a low temperature, preferably +10° C. or less, with stirring. The reactor may be charged with the spherical $MgCl_2$ support and the transition metal component in either order, i.e. the spherical $MgCl_2$ support may be added first and then the transition metal component may be added, or vice versa but the addition of the spherical $MgCl_2$ support to the transition metal component is preferred. The transition metal component can be diluted with an aliphatic or aromatic organic solvent, preferably an aliphatic hydrocarbon most preferably a linear aliphatic hydrocarbon like heptane or a mixture of branched hydrocarbons like Isopar-H. The spherical $MgCl_2$ support is added to the reactor over a period of time, preferably between about 4 minutes to about 300 minutes. The molar ratio of the Mg of the spherical $MgCl_2$ support to the transition metal is between 1:100 and 1:5, preferably between 1:50 and 1:8 and most preferably between 1:25 and 1:9.

The reaction product of the spherical $MgCl_2$ support and the transition metal component is slowly heated to a pre-determined temperature of between about 30° C. and 100° C. In a preferred embodiment, the reactor is heated to a temperature of between about 40° C. and 90° C. over a period of about 2 hours. An electron donor is added to the reactor when it reaches the pre-determined temperature. This precatalyst is then further heated to a temperature of at least 80° C., preferably between 100° C. and 125° C., more preferably between 100° C. and 110° C. and held at that temperature for a predetermined period of time, preferably between about 10 minutes and two hours. The resulting mixture is then cooled to room temperature and filtered to remove the solid component. The solid component is extracted at elevated temperatures using a mixture of an organic solvent and the transition metal. It is preferred to apply the Soxhlet extraction method. The organic solvent can be an aliphatic or aromatic hydrocarbon, preferably an aromatic hydrocarbon and most preferably ethylbenzene which has the same boiling point of 136° C. than $TiCl_4$ which guaranties a constant ratio between $TiCl_4$ and the organic solvent in the gas phase and in the extraction zone.

In one embodiment of the current invention, the procedure to make the Ziegler-Natta catalyst is:

a) Reacting the $MgCl_2$-xROH with neat $TiCl_4$ at −30° C. to +40° C., more preferably at −20 C to +20 C, even more preferably between −10 C and +10 C by slow addition of the $TiCl_4$ to the $MgCl_2$-xROH/organic solvent suspension while providing constant stirring.

b) Increasing the temperature of the above reaction mixture to between about 30° C. and 100° C., preferably between about 40 and 90° C., followed by addition of an internal electron donor and continuing to heat the mixture to at least 80° C. for about 1 to 2 hours.

c) Filtering the reaction mixture at room temperature to obtain the solid precatalyst.

d) Extracting the precatalyst using the Soxhlet extraction method employing $TiCl_4$ and ethylbenzene (at a volume ratio of about 30:70, preferably 20:80, most preferably 10:90) for 1-5 hours, preferably 1-4 hours, most preferably 1-3 hours at a temperature of at least 100° C., preferably 100-135° C. most preferably 120-130° C.

e) cooling the catalyst to room temperature (20° C.), washing several times with a hydrocarbon like pentane, hexane or heptane, and then drying under vacuum and/or elevated temperature of 30-100° C., preferably 40-90° C., most preferably 50-80° C.

In a second embodiment of the invention, the method comprises:

a) preparing a cooled portion of neat $TiCl_4$ or of $TiCl_4$ diluted with a non aromatic hydrocarbon.

b) reacting the neat or diluted $TiCl_4$ at −30° C. to +40° C., more preferably at −20° C. to +20° C., most preferably between −10° C. and +10° C. by slow addition of the preformed, spherical particles of $MgCl_2$-xROH while providing constant stirring.

c) increasing the temperature of the reaction mixture to about 30 to 100° C., preferably to about 40 to 90° C., followed by addition of an internal electron donor and continuing to heat the mixture to at least 80° C.

d) filtering the reaction mixture at room temperature e) Extracting the precatalyst using the Soxhlet extraction method employing TiCl$_4$ and ethylbenzene (at a volume ratio of about 30:70, preferably 20:80, most preferably 10:90) for 1-5 hours, preferably 1-4 hours, most preferably 1-3 hours at a temperature of at least 100° C., preferably 100-135° C. most preferably 120-130° C.

f) Cooling the catalyst to room temperature (20° C.), washing several times with a hydrocarbon, like pentane, hexane or heptane, and then drying under vacuum and/or elevated temperature of 30-100° C., preferably 40-90° C., most preferably 50-80° C.

The Soxhlet extraction method is generally well known in the art. In this case the Inventors took the precatalyst and placed it on a porous glass frit. This was loaded into the main chamber of the Soxhlet extractor. The Soxhlet extractor is placed onto a flask containing the extraction solvent, in this case the TiCl$_4$ and ethylbenzene. The Soxhlet is then equipped with a condenser. The solvent is heated to reflux. The solvent vapor travels up a distillation arm, and floods into the chamber housing the frit of solid. The condenser ensures that any solvent vapor cools, and drips back down into the glass jacketed chamber housing the solid material which is maintained at about 100° C. to 135° C., most preferably 120 to 130° C. The chamber containing the precatalyst slowly fills with warm solvent. Any contaminants in the precatalyst will then dissolve in the warm solvent and drip back down to the heating chamber, leaving behind the catalyst. Other less preferred methods to extract the contaminants from the pre-catalyst include, but are not limited to washing steps with a mixture of an organic solvent and TiCl$_4$ at a temperature of at least 100° C., preferably 100-135° C., most preferably 120-130° C. The organic solvent can be an aliphatic or aromatic hydrocarbon, preferably an aromatic hydrocarbon and most preferably ethylbenzene. While this specification only speaks to the Soxhlet extraction method, the inventors note that the current invention is valid with any extraction method that uses an organic solvent and a transition metal in solution.

The spherical MgCl$_2$-xROH support is better defined, where R is one or more of the following (provided that the total moles add up to "x"): a linear, cyclic or branched hydrocarbon unit with 1-10 carbon atoms and where ROH is an alcohol or a mixture of at least two different alcohols, preferably where the ROH is ethanol or a mixture of ethanol and a higher alcohol with R being a linear, cyclic or branched hydrocarbon unit with 3-10 carbon atoms like propanol, butanol, hexanol, heptanol or octanol, preferably 4-10 carbon atoms like butanol, hexanol, heptanol or octanol; and where x has a range of about 1.5 to 6.0, preferably about 2.5 to 4, more preferably about 2.9 to 3.4, and even more preferably 2.95 to 3.35. If ROH is a mixture of ethanol and a higher alcohol, the molar ratio of ethanol:higher alcohol is at least 80:20, preferably 90:10, most preferably 95:5.

The internal electron donors referenced in the procedure are typically a Lewis base. Suitable electron donors include diesters, diethers and succinates. Preferred internal donor compounds included carboxylic acid derivatives and in particular phthalic acid derivatives having the general formula:

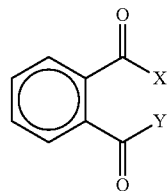

wherein X and Y each represent a chlorine or bromine atom or a C1-C10 alkoxy-group or X and Y taken together represent an oxygen atom forming an anhydride function. Particularly preferred internal electron donor compounds are phthalic esters of formula (I) wherein X and Y each are a C1-C8 alkoxy group, such as a methoxy, ethoxy, n-propyloxy, isopropyloxy, n-butyloxy, sec.-butyloxy, or tert.-butyloxy group. Examples of preferred phthalic esters include diethyl phthalate, di-n-butyl phthalate, di-isobutyl phthalate, di-n-pentyl phthalate, di-n-hexyl phthalate, (n-propyl)(n-heptyl)phthalate, (i-propyl)(n-heptyl)phthalate, di-n-heptyl phthalate, di-n-octyl phthalate, di-nonyl phthalate, di-1-nonyl phthalate or di-2-ethylhexyl phthalate.

Further examples of preferred internal electron donor compounds include diesters of 3- or 4-membered, optionally substituted cycloalkane 1,2-dicarboxylic acids, as well as monoesters of substituted benzophenone 2-carboxylic acids or substituted benzophenone 3-carboxylic acids. As hydroxy compounds in the esterification reaction for synthesis of these esters usual alkanols such as C1-C15 or C5-C7 cycloalkanols, which alkanols optionally may be substituted with one or more C1-C8 alkyl groups, as well as C1-C10 phenols, are used A further group of suitable internal donor compounds are the non-substituted and substituted (C1-C10 alkyl)-1,3-propane diethers and derivatives of the group of succinates.

Preferably, the electron donor is a diester, such as di-isobutylphthalate (D-i-BP), di-n-butylphthalate (D-n-BP), (n-propyl)(n-heptyl)phthalate, (isopropyl)(n-heptyl)phthalate, di-isooctylphthalate, di-2-ethyl, hexylphthalate, and di-isononylphthalate.

Also, mixtures of two or more internal electron donor compounds may be used in the preparation of the solid catalytic component of the invention.

When used in the preparation of the particulate solid component, the internal electron donor compound in general is used in an amount of from about 0.01 to about 2 mole, preferably from about 0.04 to about 0.6 mole, more preferably from about 0.05 to about 0.2 mole for each mole of the magnesium halide compound.

The Catalytic System:

The catalytic systems of the invention in addition to the solid catalytic component further comprise at least one aluminum compound as co-catalyst. In addition to the aluminum compound(s) the catalytic system of the invention preferably comprises at least one external electron donor compound.

Examples of suitable aluminum compounds include aluminum trialkyls and derivatives thereof wherein an alkyl group is substituted by an alkoxy group or a halogen atom, e.g. chlorine or bromine atom. The alkyl groups may be the same or different. The alkyl groups may be linear or branched chain alkyl groups. Preferred trialkylaluminum compounds are those wherein the alkyl groups each have 1 to 8 carbon atoms, such as trimethylaluminum, triethylaluminum, tri-isobutylaluminum, trioctylaluminum or methyldiethylaluminum.

Examples of external electron donor compounds which may be used in the catalytic system of the invention include mono- and polyfunctional carboxylic acids, carboxylic anhydrides and carboxylic esters, and ketones, ethers, alcohols, lactones as well as organic phosphorus and silicon compounds. Also, a mixture of two or more external electron donor compounds may be used. The external electron donor compound and the internal electron donor compound used in the preparation of the solid catalytic component a) may be the same or different. Preferred external electron donor compounds are organosilicon compounds of general formula (II)

$$R1_n Si(OR2)_{4-n} \quad (II)$$

wherein each of the R1's, which may be the same or different, represents a C1-C20 alkyl group, a 5- to 7-membered cyclic alkyl group optionally substituted with C1-C10 alkyl, a C6-C18 aryl group or a C6-C18 aryl-C1-C10 alkyl group, an R2 may be the same or different and is a C1-C20 alkyl group and n is the integer 1, 2 or 3.

Preferred compounds of formula (II) are diisopropyldimethoxysilane, isobutylisopropyldimethoxysilane, diisobutyldimethoxysilane, dicyclopentyldimethoxysilane, cyclohexylmethyldimethoxysilane, dicyclohexyldimethoxysilane, isopropyl-tert.-butylidimethoxysilane, isopropyl-sec.-butylidimethoxysilane, and isobutyl-sec.-butylidimethoxysilane.

Preparation of the Catalytic System

To prepare the catalytic system of the invention the aluminum compound as co-catalyst and the external electron donor compound may be contacted with the solid catalytic component separately in any order or mixed together, normally at a temperature in the range of from about 0° C. to 200° C., preferably from about 20° C. to about 90° C. and a pressure of from about 1 to about 100 bar, in particular from about 1 to about 40 bar.

Preferably, the aluminum compound co-catalyst is added in such an amount that the atomic ratio of the aluminum compound to the transition metal of the solid catalytic component is from about 10:1 to about 800:1, in particular from about 20:1 to about 200:1.

The catalytic systems of the invention may be advantageously used in the polymerization of alk-1-enes. Suitable alk-1-enes include linear or branched C2-C10 alkenes, in particular linear C2-C10 alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalytic systems of the invention comprising the solid catalytic components and as co-catalyst an aluminum compound or an aluminum compound and an external electron donor compound are excellent catalytic systems for use in the production of propylene polymers, both homo polymers of propylene as well as co-polymers of propylene and one or more further alk-1-enes having up to 10 carbon atoms. The term co-polymers as used herein also refers to co-polymers wherein the further alk-1-ene having up to 10 carbon atoms is incorporated randomly. In these co-polymers in general the co-monomer content is less than about 15% by weight. The copolymers may also be in the form of so-called block or impact copolymers, which in general comprise at least a matrix of a propylene homo polymer or propylene random co-polymer containing less than 15% by weight of a further alk-1-ene having up to 10 carbon atoms and a soft phase of a propylene co-polymer (rubber phase) containing 15% to 80% by weight of further alk-1-enes having up to 10 carbon atoms. Also, mixtures of co-monomers are contemplated, resulting in, for example, ter-polymers of propylene.

Polymerization

The production of the propylene polymers may be carried out in any common reactor suitable for the polymerization of alk-1-enes, either batchwise or, preferably, continuously, i.e., in solution, as suspension polymerization including the bulk polymerization in liquid monomer or as gas phase polymerization. Examples of suitable reactors include continuously operated stirred reactors, loop reactors, fluid bed reactors, or horizontal or vertical stirred powder bed reactors. It will be understood that the polymerization may be carried out in a series of consecutively coupled reactors. The reaction time depends on the chosen reaction conditions. In general, the reaction time is from about 0.2 to about 20 hours, usually from about 0.5 to about 10 hours most preferably between 0.5 and 2 hours.

In general the polymerization is carried out at a temperature in the range of from about 20° C. to about 150° C., preferably from about 50° C. to about 120° C., and more preferably from about 60° C. to about 95° C., and a pressure in the range of from about 1 to 100 bar, preferably from about 15 to about 50 bar, and more preferably from about 20 to about 45 bar.

The molecular weight of the resulting polymers may be controlled and adjusted over a wide range by adding polymer chain transfer or termination agents as commonly used in the art of polymerization, such as hydrogen. In addition an inert solvent, such as toluene or hexane, or an inert gas, such as nitrogen or argon, and smaller amounts of a powdered polymer, e.g., polypropylene powder may be added.

The (weight) average molecular weights of the propylene polymers produced by using the catalytic system of the invention in general are in the range of from about 10,000 to 2,000,000 g/mole and the melt flow rates are in the range of from about 0.01 to 2000 g/10 min, preferably from about 0.1 to 100 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included within the scope of the invention.

The catalytic systems of the invention enable to polymerize alk-1-enes producing polymers having a good morphology and a high bulk density when compared with the prior art catalytic systems. In addition the catalytic systems of the invention show a dramatic increase of productivity.

Due to their good mechanical properties the polymers obtainable by using the catalytic system comprising the catalytic component solids of the invention, and in particular the propylene homo polymers or the co-polymers of propylene with one or more further alk-1-enes having up to 10 C-atoms, can be used advantageously for the production of films, fibers or moldings and in particular for the production of films.

The solid catalytic components, catalytic systems and polymers obtained in the examples below were characterized by carrying out the following tests.

Experimental Section:

Catalyst Synthesis

Several samples of catalysts of the present invention were produced and tested to demonstrate the improved activity and to determine the physical characteristics of exemplary embodiments of the catalyst. The following description of exemplary embodiments are not intended to limit the scope of the invention in any way.

FIG. 1 shows the equipment used to produce the pre-catalyst. The reactor vessel (10) includes a reaction chamber (12) and a jacket (14). The jacket includes an inlet port (16) and an outlet port (18). To maintain the selected temperature in the reaction chamber, fluid at the desired temperature is pumped into the jacket through the inlet port, flows around the reaction chamber, and exits through the outlet port. A motor (20) drives a stirrer (22) within the reaction chamber (12). A refluxing condenser (24) is provided with a nitrogen purge source (26). A discharge port (28) is provided to remove the reaction product from the reaction chamber. An addition port (30) with a cap (32) is provided to allow the components to be added to the reaction chamber.

The following describes the general procedure used to produce the catalysts described below. One or more parameters was varied for each catalyst preparation as described below. The procedure described was used to create exemplary samples of the catalyst of the present invention, and is not intended to limit the scope of the invention. Catalysts were made using the forty micron support, the sixty micron support and the ninety micron support of $MgCl_2 xEtOH$ (see column 2 of Table 2 for the particular support used in a particular run). Unless otherwise noted the x of "xEtOH" for the 90 micron is 3.2 and for the 60 and 40 micron it is 3.1 (see Table 1). The spherical supports were obtained from a commercial supplier but also could be made as detailed in the background section.

For each catalyst preparation either the spherical $MgCl_2$ support (slurried in ethylbenzene or isopar-H, as noted in Table 2) or, for the alternative embodiment, $TiCl_4$ was initially charged to the jacketed, glass reactor (10). The molar ratio of Ti/Mg used in each of the catalyst runs is provided in column 3 of Table 2. The molar ratio of Ti/Mg is preferably between 1:100 and 1:5, preferably between 1:50 and 1:8 and most preferably between 1:25 and 1:9.

While the actual quantities of the initial charges would vary slightly for each catalyst prep run, in general the initial charge was based on using approximately 10 g $MgCl_2 xEtOH$ (equivalent to 4 g $MgCl_2$). The molar ratios of the D-n-BP (di-n-butyl phthalate) or D-i-BP (di-i-butyl phthalate) to the Mg used are found in Column 8 of Table 2. The molar ratio of DBP/Mg (D-i-BP/Mg or D-n-BP/Mg) is preferably 0.05 to 3.0, more preferably 0.1 to 0.2, and even more preferably between about 0.12 to about 0.15. The jacket temperature was reduced to sub-ambient conditions, which would be approximately +10° C., unless noted otherwise in column 5 of Table 2.

The $MgCl_2 \cdot xEtOH$ and the $TiCl_4$ were then combined. The order of the combination is found in Table 2, columns 4 and 5. The component listed in column 4 is the first component of the procedure, i.e. the component put in the jacketed, glass reactor. For safety reasons, neat $TiCl_4$ was not added to solid $MgCl_2$; instead, the $MgCl_2$ was slurried in an inert solvent, e.g. heptane or isopar-H and then added. The slurry medium (when used) is also shown in column 4. The component in column 5 shows the added component and the amount of time to add the component. If a temperature appears in either of the columns, it is the temperature of that solution at the time of addition. The temperature of the $1^{st}$ component in the jacketed, glass reactor was always 0° C. unless noted in column 4. The temperature of the second component (the added component) was always at room temperature unless otherwise noted in column 5.

The addition was performed slowly to allow the mixture to react, usually over a period from about 5 seconds up to about 300 minutes, more preferably from about 10 seconds to about 90 minutes, even more preferably from about 9 minutes to about 45 minutes. The time of reaction before heating is noted in column 5. For example, in catalyst run 56 the liquid $TiCl_4$ at 22° C. is added to the $MgCl_2$-xEtOH complex suspended in ethylbenzene which was at a temperature of 0° C. over a period of twenty minutes. As another example in catalyst run 58, the $MgCl_2$-xEtOH suspended in ethylbenzene and chilled to 0° C. was added over 10 seconds to the liquid $TiCl_4$ which was at temperature 0° C.

The second component, i.e. $TiCl_4$ to $MgCl_2$ or vice versa, was then added under a nitrogen purge. After allowing a few minutes for the $TiCl_4$ and $MgCl_2$ support to react, which is noted as the "add time" in column 5, the temperature was increased at approximately 1° C. per minute to 50° C. At 50° C., either the di-n-butylphthalate (D-n-BP) or di-isobutyl-phthalate (D-1-BP), as noted in column 8, was added. The combined solution was held at 50° C. for the hold time noted in column 7. The jacket temperature was then increased to approximately 105° C. and held there for approximately from about 1 to 2 hours, the actual time being noted in column 9.

Figure 2:
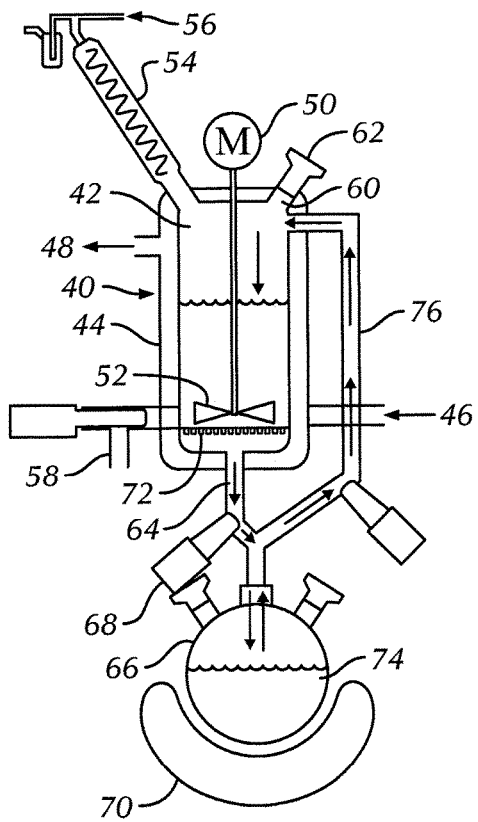
FIG. 2 is a diagram of the equipment used to extract the activated catalyst from the pre-catalyst preparation.

After 2 hours at 105° C., the reactor contents were transferred to a Soxhlet extraction device, filtered while still hot and then washed with heptane. As shown in FIG. 2, the Soxhlet extractor is used to activate the catalyst. The extraction device includes a first vessel (40) with a main chamber (42) and a jacket (44). The jacket includes an inlet port (46) and an outlet port (48). To maintain the selected temperature in the main chamber, fluid at the desired temperature is pumped into the jacket through the inlet port, flows around the reaction chamber, and exits through the outlet port. A motor (50) drives a stirrer (52) within the main chamber (42). A refluxing condenser (54) is provided with a nitrogen purge source (56). A discharge port (58) is provided to allow fluids to be removed from the main chamber. An addition port (60) with a cap (62) is provided to allow the pre-catalyst reaction product to be added to the reaction chamber.

A filter (72) is provided at the bottom of the main chamber to retain the solid pre-catalyst material. A port (64) is provided at the bottom of the reaction chamber (42) which provides a flow path to an extraction vessel (66). A plug (68) is provided to control flow from the reaction chamber to the extraction vessel. The extraction vessel sits within a heating mantle (70) which is used to heat the solvent (74) in the extraction vessel to reflux. The solvent vapor travels through a distillation line (76) into the main chamber (42). As the warm solvent fills the main chamber (42), the port (64) is opened to allow the solvent containing the catalyst to empty back into the extraction vessel. Each of the precatalysts was Soxhlet-extracted at 125° C. for 2 hours with a 90/10 volume mixture of ethylbenzene and $TiCl_4$. After extraction the catalyst was washed with heptane and vacuum dried.

Any changes from the above procedure are noted as follows:

Catalyst 63: The D-n-BP was added at 85° C. rather than 50° C.

Catalyst 101: A portion of the EtOH was first removed from the $MgCl_2$ support by vacuum drying the support at 55° C. A sample of the support, i.e. 0.5 grams, was submitted for TGA analysis, which indicates that 2.84 equivalents of EtOH remained on the support (=$MgCl_2$-2.84EtOH).

Catalyst 105: The $MgCl_2$ support was de-alcoholated in the same manner as catalyst 101 and was de-alcoholated further by increasing the oil bath temperature to 70° C. and pulling a vacuum on the sample. The residual alcohol content, prior to reaction with TiCl4, was reduced to 2.4 equivalents (=$MgCl_2$-2.4EtOH).

Catalyst 107: The $MgCl_2$ support was de-alcoholated in the same manner as catalyst 105.

Catalyst 116: Rather than thermally removing EtOH from the $MgCl_2$ catalyst, a portion of the EtOH was removed by reaction with $SiCl_4$. Assuming 1 equivalent of EtOH removed for every equivalent of $SiCl_4$, sufficient $SiCl_4$ was added to lower the EtOH content from 3.1 to 2.6 equivalents (=$MgCl_2$-2.6EtOH). After addition of the $SiCl_4$ at 0° C., the reaction mixture was warmed slowly to 50° C. Between 25° C. and 50° C., the reaction medium changed from a well suspended solid that appeared as a milky liquid, to a stirred solid which was not suspended. A sample was pulled for photomicrographs, which revealed the $MgCl_2$ support spheres were fused in "grape-like" clusters. After cooling to room temperature, the liquid was decanted, the solid washed with heptane and reslurried in isopar-H and cooled to 0° C. prior to addition of $TiCl_4$, which was also cooled to 0° C. After $TiCl_4$ addition the reaction mixture was allowed to sit over the weekend at room temperature.

Catalyst 127: $MgCl_2$-3.1EtOH (10.26 g) was suspended in isopar-H (200 ml) and cooled to -3° C. $TiCl_4$ (50 ml) was diluted with 150 ml of isopar-H and then chilled to ~0° C. with ice. The $TiCl_4$ was slowly added over 44 minutes to the $MgCl_2$. After complete addition of the $TiCl_4$ the temperature was held constant for 10 minutes and then slowly increased to 50° C. over 100 minutes. At 50° C. DBP was slowly added. The solution was then allowed to cool to room temperature and the preparation was suspended overnight. The next day the temperature was increased to 50 C, held there for 120 minutes and then increased to 105° C. and held there for 90 minutes. The "precatalyst" was subsequently transferred to the activation vessel and Soxhlet extracted as usual. The catalyst was tested twice under bulk polymerization conditions and yielded very poor activity. It appears discontinuing the preparation overnight after addition of the DBP is very detrimental to the catalyst performance.

Catalyst 137: The procedure used for preparation of catalyst 127 was repeated, however, rather than stopping the preparation for the evening after DBP addition, the reaction mixture was allowed to sit overnight after the $TiCl_4$ addition at ambient conditions. The next day the reaction mixture was heated to 50° C. and D-n-BP was added. The rest of the catalyst preparation was the same as described for catalyst 127.

Catalysts 20, 103 and 10740 were made using a 40-micron MgCl2-3.1 EtOH as spherical MgCl2 support Catalyst 20: The same procedure employed with catalyst 78 (which followed the standard procedure described above) except that Catalyst 20 used a 40-micron $MgCl_2$-3.1EtOH support and Catalyst 78 used a 90-micron $MgCl_2$-3.2EtOH. The $MgCl_2$-3.1EtOH was added slowly to chilled $TiCl_4$. The catalyst morphology appeared to be very good, but the activity, although good, was slightly lower than that observed with similar catalysts made on the 60 and 90-micron supports. The catalyst is pale yellowish green in color.

Catalyst 103: In this preparation, the goal was to add 40-micron MgCl2×3.1EtOH/Isopar H to chilled TiCl4 in a controlled fashion, and to minimize the amount of Isopar H being used. Twenty grams of 40-micron $MgCl_2$-3.1EtOH were combined with 23 ml of Isopar H. The slurry was too thick, so an additional 27 ml of Isopar H were added. The slurry then appeared to still be thick but manageable. Another 20 grams of support and 50 more milliliters of Isopar H were added to the 250 ml flask. A syringe equipped with a 12-gauge needle was used to convey the slurry. 200 ml of TiCl4 were added to the precatalyst vessel, which was then cooled to -5° C. The $MgCl_2$-3.1EtOH/Isopar H slurry was cooled to ~0 C, but was then too thick to transfer via a syringe needle, so a ⅛" plastic tubing was used to dropwise transfer the $MgCl_2$-3.1EtOH/Isopar H slurry into the precatalyst vessel. This catalyst exhibited very good activity in bulk (56.1 kg PP/g-cat. hr.) and gas phase (32.2 kg PP/g-cat. hr.) polymerization conditions. The final catalyst was yellow to pale yellow in color.

Catalyst 10740: The same molar ratios used in Catalyst 103 were followed for this example. The difference was that the Isopar H was replaced with heptane. The precatalyst reactor was charged with 200 ml of $TiCl_4$ and 90 ml of heptane and then cooled to -3° C. The heptane was used to reduce the viscosity of the reaction medium. 40 grams of 40-micron $MgCl_2$-3.1EtOH was slowly added to the stirred TiCl4/heptane mixture. An amp meter was installed in line to monitor the current draw on the stirrer motor. The initial amp reading was 0.026. By the time all the $MgCl_2$-3.1EtOH had been added the reaction mixture temperature had increased 2° C., from -3 C to -1 C and the motor amps due to the thickening of the reaction medium had increased from 0.026 to 0.034. As the reactor jacket set point temperature was increased from -5° C. to 0° C., then 5° C. and then 10° C., the stirrer amps at first increased to 0.038 and then to 0.039, and then dropped to 0.029. This catalyst yielded even higher activity than Catalyst 103. The final catalyst color was yellow.

TABLE 2

| | | | | | | | | | |
|---|---|---|---|---|---|---|---|---|---|
| Variation in parameters to make the Inventive Catalysts | | | | | | | | | |
| Catalyst | Support Size (μ) | TiCl$_4$/MgCl$_2$ Ratio | 1$^{st}$ Component Slurry Medium and Temp | 2$^{nd}$ (added) Component, add Time and Temp | TiCl$_4$/ EtOH Ratio | Hold Time (min) | DBP/MgCl$_2$ Ratio | Hold (min) | Observations |
| 56 | 90 | 20 | MgCl$_2$ EthylBenzene | TiCl$_4$ 20 min | 6.2 | 30 | D-n-BP 0.15 | 80 | Edges not well defined |
| 58 | 90 | 44 | TiCl$_4$ | MgCl$_2$ 10 sec | 14 | 30 | D-n-BP 0.15 | 60 | |
| 61 | 90 | 44 | TiCl$_4$ | MgCl$_2$ 9 min | 14 | 20 | D-n-BP 0.15 | 60 | Some fractured catalyst particles |
| 63 | 90 | 44 | TiCl$_4$ | MgCl$_2$ 7 min | 14 | 20 | D-n-BP 0.15 | 10 | Fused into grape-like clusters |
| 65 | 90 | 44 | TiCl$_4$ | MgCl$_2$ 9 min | 14 | 20 | D-n-BP 0.12 | 90 | No clusters, no grape-like cluster, but a few fractured particles, smooth edged |

TABLE 2-continued

Variation in parameters to make the Inventive Catalysts

| Catalyst | Support Size (μ) | TiCl$_4$/MgCl$_2$ Ratio | 1$^{st}$ Component Slurry Medium and Temp | 2$^{nd}$ (added) Component, add Time and Temp | TiCl$_4$/ EtOH Ratio | Hold Time (min) | DBP/MgCl$_2$ Ratio | Hold (min) | Observations |
|---|---|---|---|---|---|---|---|---|---|
| 67 | 90 | 44 | MgCl$_2$ EthylBenzene (0° C.) | TiCl$_4$ 10 min (0° C.) | 14 | 20 | D-n-BP 0.12 | 10 | Poor |
| 70 | 90 | 44 | MgCl$_2$ Isopar-H | TiCl$_4$ 29 min | 14 | 20 | D-n-BP 0.12 | 10 | |
| 73 | 90 | 44 | MgCl$_2$ Isopar-H | TiCl$_4$ 4 min (0° C.) | 14 | 10 | D-n-BP 0.12 | 20 | Very good, spherical particle shape maintained |
| 76 | 90 | 44 | MgCl$_2$ Isopar-H | TiCl$_4$ 12 min | 14 | 25 | D-i-BP 0.12 | 90 | Very good, spherical particle shape maintained |
| 78 | 90 | 55 | TiCl$_4$ | MgCl$_2$ 20 min (0° C.) | 18 | 25 | D-n-BP 0.12 | 60 | Very good, very few fragmented particles |
| 80 | 60 | 55 | TiCl$_4$ | MgCl$_2$ 15 min (0° C.) | 18 | 20 | D-n-BP 0.12 | 90 | Almost no fines, occasional fragmentation of the spherical particles |
| 89 | 60 | 50 | TiCl$_4$ | MgCl$_2$ 13 min (0° C.) | 16 | 17 | D-n-BP 0.12 | 75 | Some particle fracturing, but were large and produced very few PP fines |
| 91 | 60 | 50 | TiCl$_4$ | MgCl$_2$ 12 min (0° C.) | 16 | 20 | D-i-BP 0.12 | 55 | |
| 93 | 60 | 50 | TiCl$_4$ | MgCl$_2$ 10 min (+10° C.) | 16 | 30 | D-i-BP 0.12 | 40 | Moderate particle fracturing |
| 95 | 60 | 50 | TiCl$_4$ | MgCl$_2$ 16 min (−10° C.) | 16 | 20 | D-i-BP 0.12 | 75 | Fewest particle fracturing of all runs |
| 97 | 60 | 50 | MgCl$_2$ Isopar-H | TiCl$_4$ 30 min (0° C.) | 12 | 20 | D-n-BP 0.12 | 20 | Good spherical shape, but considerable fracturing |
| 101 | 60 | 50 | TiCl$_4$ | MgCl$_2$ 11 min (0° C.) | 13 | 20 | D-n-BP 0.12 | 60 | Very little fracturing |
| 105 | 60 | 50 | TiCl$_4$ | MgCl$_2$ 31 min (0° C.) | 18 | 20 | D-n-BP 0.11 | 60 | Slightly better sphericity than run 101, very little fracturing |
| 107 | 60 | 50 | TiCl$_4$ | MgCl$_2$ 16 min (0° C.) | 28 | 15 | D-i-BP 0.11 | 90 | Very similar to 105 |
| 116 | 60 | 11 | MgCl$_2$ Isopar-H | TiCl$_4$ 15 min (0° C.) | 3.6 | 60 | 0.12 | 80 | Moderate fracturing of the particles |
| 127 | 60 | 11 | MgCl$_2$ Isopar-H | TiCl$_4$ 44 min (0° C.) | 3.5 | 20 | 0.12 | 90 | |
| 137 | 60 | 11 | MgCl$_2$ Isopar-H | TiCl$_4$ 90 min (0° C.) | 3.5 | 20 | 0.12 | 90 | Very good morphology |
| 20 | 40 | 55 | TiCl$_4$ | MgCl$_2$ 36 min (0° C.) | 15 | 14 | 0.12 | 60 | Very good morphology |
| 103 | 40 | 11 | TiCl$_4$ Isopar-H | MgCl$_2$ 40 min (0° C.) | 4 | 12 | 0.12 | 60 | Good Morphology |
| 10740 | 40 | 11 | TiCl$_4$ heptane | MgCl$_2$ 170 min (0° C.) | 4 | 13 | 0.12 | 60 | Good Morphology |

For comparison purposes, Ziegler-Natta catalysts, which were made using the same 40 micron (Comparative Catalyst 40), 60 micron (Comparative Catalyst 60) or 90 micron MgCl2.xEtOH support (Comparative Catalyst 90), which were produced by a method similar to that described in U.S. Pat. Nos. 4,829,034 and 5,137,856. Rather than performing the Soxhlet extraction, the precatalyst was treated a second time at 105° C. for 2 hours using neat TiCl4, filtered and then washed with heptane. Comparative Catalyst 40 had a 40 micron support. Comparative Catalyst 60 had a 60 micron support. Comparative Catalyst 90 had a 90 micron support. The parameters for these comparative examples are shown in Table 3 and the polymerization results are shown in Table 4 and Table 5.

TABLE 3

| | Support Size (μm) | % Ti | % Mg | PSD (Catalyst) | | |
|---|---|---|---|---|---|---|
| | | | | D10 | D50 | D90 |
| Comparative Catalyst 90 | 90 | 2 | 19.3 | 51 | 78 | 109 |
| Comparative Catalyst 60 | 60 | 1.8 | 20 | n.m | 55 | n · m |
| Comparative Catalyst 40 | 40 | 1.8 | 20.6 | 19 | 32 | 45 |

Polymerization Testing

Catalyst performance was tested under both bulk polymerization conditions and gas phase polymerization conditions. Bulk polymerization testing was performed using a 5-liter reactor, 1800 grams of propylene, 2.0 ml of 0.1M cyclohexyl-methyl-dimethoxysilane, 7.0 ml of 1.6M triethylaluminum (TEAl), and 0.5 grams of hydrogen, which were inventoried in the reactor in the following order. After addition of hydrogen, TEAl and silane were premixed and then flushed into the reactor using 900 grams of propylene. The last component added were the ~0.02 grams of catalyst using the remaining 900 grams of propylene. The reactor was then heated quickly to 70° C., usually within 2-3 minutes, and the polymerization run allowed to proceed for 1 hour. The propylene remains in the liquid phase throughout the heat up process.

The bench scale reactor was equipped with a stirrer that can also accommodate gas phase polymerizations. Under gas phase conditions the order of addition was the same, but the propylene charges are reduced in size to ~200 grams. Similarly, TEAL and silane charges were reduced by ⅓ to ½, and hydrogen was reduced by ⅕$^{th}$ to 1/10$^{th}$ that of the bulk runs. The catalyst was injected at 40° C. and the reactor programmed to heat to 75° C. over 10 minutes. Gas phase conditions were maintained by controlling the introduction of the propylene into the system. As the system was heated up to final temperature, the propylene was added at a rate to ensure that the pressure in the reactor vessel is such that the propylene always remains in the gas phase. To insure gas phase conditions, the reactor pressure was maintained at 400 psig at 75° C. with gaseous propylene being added though a mass flow meter upon demand.

The physical characteristics of the polypropylene polymers produced using the various catalysts were determined using the tests described below. The results obtained from the tests are summarized in tables 6 and 7.

Activity. The activity results reported throughout this study are based upon polymer yield in grams divided by the weight of catalyst charged to the reactor in grams for a 1-hour polymerization. The inventors determined that there was no need to account for lost activity due to residual solvent entrained in the inventive catalysts when compared to the Comparative Catalyst because the entrained amount was virtually identical, as would be expected because the catalysts were made using the same support.

The activities reported throughout this specification do not adjust for entrained solvents. Thus the activity is based upon grams of polymer/gram of catalyst+solvent. To determine the activity based only upon the dry catalyst, Thermal Gravimetric Analysis (TGA) was performed on several catalysts. TGA was performed by placing ~10 milligrams grams of a catalyst in TA Instrument's SDT Q600. The temperature was raised at a rate of 10.0° C./min to 300° C. and the weight of the catalyst was recorded continuously as a function of the increasing temperature. The weight loss from 0 to 190 C corresponds to the loss in residual solvent.

Xylene Solubles (wt % XS). Xylene solubles were measured using Viscotek's Flow Injector Polymer Analysis (FIPA) technique which is well known in the industry. Viscotek has published an article entitled, *"FIPA for xylene soluble determination of polypropylene and impact copolymers"* (which may be ordered from the Viscotek website, http://www.viscotek.com/applications.aspx) showing that the Viscotek FIPA method exhibits a 0.994 $r^2$ correlation with ASTM Method D5492-06 (equivalent to ISO 16152) over the range of 0.3% to 20% Xylene solubles. Therefore, one of ordinary skill in the art could reproduce the inventive results using either the Viscotek FIPA method or ASTM Method D5492-06. The weight percent of xylene solubles in the polypropylene is an indication of the stereoregulating ability of the polypropylene the higher the wt % XS, the poorer the stereoregulating ability of the catalyst.

Melt Flow Rate (MFR) Measurement. The melt flow rate effect was measured using ASTM Method D 1238-04. For each 5 gram sample of polymer, 0.2 grams of a stabilizing package was added. The additive package consists of 50 wt. % Irganox 1010 and 50 wt. % Irgafos 168. Because the polymer is exposed to air at 230° C. for several minutes during the test, this package is added to inhibit thermal and oxidative degradation of the polymer. The melt flow rate provides information concerning the molecular weight and the hydrogen response of the polymer. The higher the MFR, the higher the hydrogen response rate of the catalyst that produced the polyolefin. Similarly, the higher the MFR, the lower the molecular weight of the polymer Particle Size Analysis. Polymer particle size distribution was determined in two stages. First, because the Malvern Mastersizer feedtray is equipped with a prescreen that will not allow polymer particles greater than 2380 microns to pass, ten grams of each sample were prescreened through a 2000 micron sieve and the wt. % of material greater than 2000 microns recorded. The remaining material that passed through the 2000 micron sieve was then analyzed via a Malvern Mastersizer. The volume percent of this material smaller than 190 microns was determined as indicative of the fines in the polymer. Fines of less than 190 microns in the catalyst are sought to be avoided because fines of this size significantly reduce the amount of ethylene content that can be incorporated into a polypropylene-polyethylene copolymers made using the catalyst. However, because in almost all inventive cases there were no measurable fines smaller than 190 microns, the inventors also measured particle size below 410 microns simply for comparative purposes. In addition, the median distribution (D50) was determined for particles remaining after the >2000 micron size particles had been removed.

Photomicrographs. Photomicrographs of the MgCl$_2$-xEtOH support materials, catalysts and selected polymer samples were taken using a Olympus SZX12 microscope equipped with Diagnostic Instrument's Model 4.2 camera using Diagnostic Instrument's Spot Advanced software Version 3.5.9.1 for Windows. FIGS. 3A-3C and FIGS. 4A-4H show photomicrographs at 100× magnification of the MgCl$_2$-xEtOH support materials and of finished catalysts along with comparative Ziegler-Natta catalysts, FIGS. 5A-5J show photomicrographs at 11.2× magnification of the typical sphericity of the polymers produced by the catalysts and process of this invention Table 2 includes qualitative morphological observations of the catalyst. Examples of the terms fractured, grape like, etc are demonstrated in these figures.

Catalyst Activity Based Upon Polymerization Testing

Tables 4 and 5 summarize the bulk and gas phase polymerization results, respectively, that were obtained with the catalysts of the present invention described above. The Comparative Catalysts results are found at the bottom of the tables.

TABLE 4

BULK PHASE POLYMERIZATION RESULTS

| Catalyst | Activity (KgPP/g-cat.) | MFR | Wt % XS | % > 2000 | % < 190 | % < 410 | D50 (μm) |
|---|---|---|---|---|---|---|---|
| 56 | 66.5 | 11.9 | 2.46 | 57.4 | 2.31 | — | 1420 |
| 61 | 71.1 | 13.4 | 1.76 | 48.6 | 0 | — | 1545 |
| 63 | 76.0 | 18.1 | 1.86 | 65.2 | 0 | — | 1585 |
| 65 | 79.3 | 16.5 | 2.21 | 52.9 | 0 | — | 1620 |
| 67 | 61.5 | 22.1 | 3.33 | 58.9 | 0 | — | 1523 |
| 73 | 53.8 | 20 | 4.83 | 33.9 | 0 | — | 1618 |
| 76 | 61.5 | 23 | 5.34 | 41.0 | 0.35 | — | 1497 |
| 78 | 65.4 | 17.6 | 3.74 | 47.0 | 0 | — | 1509 |
| 80 | 50.8 | 19.7 | 3.03 | 23.3 | 0 | 2.31 | 1189 |
| 89 | 73.3 | 14.7 | 2.32 | 58.3 | 0 | 0.09 | 1585 |
| 91 | 60.0 | 21.1 | 2.3 | 23.0 | 0 | 0.18 | 1482 |
| 93 | 62.3 | 16.2 | 2.07 | 42.3 | 0 | 0.15 | 1555 |
| 95 | 62.0 | 22.3 | 2.35 | 40.0 | 0 | 0.06 | 1552 |
| 97 | 60.0 | 19 | 2.52 | 20.0 | 0 | 0.48 | 1495 |
| 101 | 78.2 | 17.4 | 1.85 | 58.9 | 0 | 0.19 | 1489 |
| 105 | 77.3 | 17.0 | 2.02 | 57.0 | 0 | 0.04 | 1584 |
| 107 | 56.7 | 24.6 | 2.28 | 45.7 | 0 | 0.49 | 1449 |
| 116 | 57.3 | 15.9 | 2.94 | 31.3 | 0.67 | 2.62 | 1417 |
| 137 | 62.7 | 16.5 | 1.38 | 59.5 | 0 | 0.07 | 1618 |
| 20 | 50.1 | 18.5 | 1.90 | 1.0 | 0.0 | 0.0 | 1675 |
| 103 | 56.1 | 18.3 | n.m. | 4.4 | 0.0 | 0.01 | 1587 |
| 10740 | 64.1 | 16.7 | n.m. | 1.9 | 0.0 | 0.1 | 1488 |
| Average results for 90μ inventive catalysts | 66.9 | 17.8 | 3.19 | 50.61 | 0.33 | — | 1540 |
| Comparative Catalyst 90 | 45.0 | 10.5 | 2.46 | 87.0 | 0 | — | 1785 |
| Average results for 60μ inventive catalysts | 63.7 | 18.6 | 2.28 | 41.75 | 0.06 | 0.61 | 1492 |
| Comparative Catalyst 60 | 43.5 | 10.2 | 1.79 | 56.0 | 0 | 0 | 1723 |
| Average results for 40μ inventive catalysts | 56.8 | 17.8 | n.m | 2.43 | 0 | 0.05 | 1583 |
| Comparative Catalyst 40 | 44.1 | 12.4 | 1.98 | 0.90 | 0 | 0 | 1696 |

TABLE 5

GAS PHASE POLYMERIZATION RESULTS

| Catalyst | Activity (KgPP/g-cat.) | MFR | Wt % XS | % > 2000 | % < 190 | % < 410 | D50 |
|---|---|---|---|---|---|---|---|
| 56 | 23.9 | 8.7 | 1.58 | 58.7 | 4.45 | — | 1350 |
| 61 | 34.4 | 9.1 | 1.65 | 33.7 | 0.46 | — | 1456 |
| 63 | 38.9 | 9.6 | 1.63 | 55.1 | 0 | — | 1437 |
| 65 | 40.0 | 9.5 | 1.56 | 39.2 | 0 | — | 1493 |
| 67 | 30.0 | 14.6 | 1.78 | 39.4 | 0.52 | — | 1479 |
| 73 | 25.0 | 12.6 | 2.83 | 13.2 | 0 | — | 1463 |
| 76 | 27.5 | 9.42 | 3.71 | 26.0 | 0.28 | — | 1458 |
| 78 | 32.5 | 13.4 | 1.32 | 73.3 | 0 | — | 1528 |
| 80 | 20.0 | 19.6 | 1.92 | 17.0 | 0 | 0.23 | 1411 |
| 89 | 36.5 | 11.0 | 1.44 | 38.7 | 0 | 0.25 | 1528 |

TABLE 5-continued

GAS PHASE POLYMERIZATION RESULTS

| Catalyst | Activity (KgPP/g-cat.) | MFR | Wt % XS | % > 2000 | % < 190 | % < 410 | D50 |
|---|---|---|---|---|---|---|---|
| 91 | 27.5 | 12.1 | 1.37 | 12.3 | 0.38 | 1.19 | 1376 |
| 93 | 34.5 | 10.3 | 1.78 | 17.5 | 0.56 | 1.41 | 1436 |
| 95 | 29.0 | 12.4 | 1.49 | 16.2 | 0 | 0.43 | 1466 |
| 97 | 25.0 | 14.1 | 1.98 | 10.7 | 0 | 0.80 | 1339 |
| 101 | 34.0 | 11.0 | 1.27 | 47.8 | 0 | 0.02 | 1629 |
| 105 | 40.0 | 12.8 | 1.37 | 51.6 | 0 | 0.03 | 1662 |
| 107 | 27.5 | 12.8 | 1.34 | 30.0 | 0 | 0.21 | 1537 |
| 116 | 29.2 | 8.3 | 1.76 | 12.1 | 0 | 1.08 | 1374 |
| 137 | 31.1 | 12.1 | 1.13 | 18.3 | 0 | 0.04 | 1673 |
| 20 | 28.7 | 12.2 | 2.4 | 1.0 | 0 | 0.01 | 1434 |
| 103 | 32.2 | 9.4 | n.m. | 0.23 | 0 | 0.23 | 1298 |
| 107 | 29.9 | 11.3 | n.m. | 0.49 | 0 | 0.03 | 1369 |
| Average results for 90μ inventive catalysts | 31.5 | 10.9 | 2.01 | 42.33 | 0.71 | — | 1458 |
| Comparative Catalyst 90 | 27.1 | 7.1 | 1.47 | 74.4 | 0 | — | 1727 |
| Average results for 60μ inventive catalysts | 30.4 | 12.4 | 1.53 | 24.75 | 0.085 | 0.52 | 1494 |
| Comparative Catalyst 60 | 25.7 | 7.13 | 1.32 | 21.8 | 0.21 | 0.72 | 1640 |
| Average results for 40μ inventive catalysts | 30.3 | 11.0 | n.m | 0.57 | 0 | 0.09 | 1367 |
| Comparative Catalyst 40 | 24.1 | 8.1 | 1.42 | 0.28 | 0 | 0.8 | 1326 |

As summarized in Tables 4 and 5, under bulk polymerization conditions, the exemplary catalysts of the present invention exhibited significantly and unexpectedly higher activity than the Comparative Catalysts.

Table 6 compares the bulk activity ranking to that obtained in the gas phase. Generally speaking, the ranking did not change. The most active catalysts in bulk (89, 101, and 105) were 3 of the 4 most active catalysts in gas phase. This indicates excellent stability of the inventive catalysts over a wide range of polymerization conditions.

TABLE 6

BULK PHASE ACTIVITY VS. GAS PHASE ACTIVITY (60 MICRON SUPPORT)

| Catalyst | Bulk Act. (Kg PP/g-cat) | Gas Activity (Kg PP/g-cat.) |
|---|---|---|
| 89 | 73.3 | 36.5 |
| 101 | 78.2 | 34.0 |
| 105 | 77.3 | 40.0 |
| 91 | 60.0 | 27.5 |
| 93 | 62.3 | 34.5 |
| 95 | 62.0 | 29.0 |
| 97 | 60.0 | 25.0 |
| 137 | 62.7 | 31.1 |
| 80 | 50.8 | 20.0 |
| 107 | 56.7 | 27.5 |
| 116 | 57.3 | 29.2 |
| Comparative Catalyst 60 | 43.5 | 25.7 |

Normally, one of ordinary skill in the art would expect a significant increase of fines (particles less than 190 μm) with the significant increases in activity demonstrated by the inventive catalysts. Table 7, however, demonstrates that this is not found for the inventive catalysts. Table 7 contains the particle size distribution data for both bulk and gas phase polymers from the three most active catalysts, as tested under bulk conditions.

TABLE 7

PARTICLE SIZE DISTRIBUTION DATA FOR THE MOST ACTIVE CATALYSTS

| Catalyst | Activity | % > 2000 μm | % < 190 μm | % < 410 μm | D50 (μm) |
|---|---|---|---|---|---|
| Bulk Polymerization | | | | | |
| 89 | 73.3k | 58.3% | 0.00% | 0.09% | 1585 |
| 101 | 78.2k | 58.9% | 0.00% | .019% | 1489 |
| 105 | 77.3k | 57.0% | 0.00% | 0.04% | 1584 |
| Comparative Catalyst 60 | 43.5k | 56.0% | 0.00% | 0.00% | 1723 |
| Gas Phase Polymerization | | | | | |
| 89 | 36.5k | 38.7% | 0.00% | 0.25% | 1528 |
| 101 | 34.0k | 47.8% | 0.00% | 0.02% | 1629 |
| 105 | 40.0k | 51.6% | 0.00% | 0.03% | 1662 |
| Comparative Catalyst 60 | 25.7k | 21.8% | 0.21% | 0.72% | 1640 |

Quite contrary to expectations, in the bulk phase testing, the third column of Table 7 demonstrates that the most active inventive catalysts actually tended to produce greater amounts of large polyolefin particles (>2000 μm) than the Comparative Catalyst 60. Yet, the most active inventive catalysts produced no fines of <190 μm. Even extending this limit up to particles of <410 μm, the inventive catalysts produced very few additional small polyolefin particles. Even more impressive, in the gas phase testing, the most active catalysts routinely doubled the amount of large polyolefin particles (>2000 μm), while actually producing no fines of <190 μm (compared to an increase of the Comparative Catalyst's <190 μm fines). Similarly, in the gas phase, the three most active inventive catalysts produced a number of small particles of <410 μm that were no more than ⅓ that of, and often less than ¹/₂₀ that of, the amount produced by the Comparative Catalyst 60.

Normally one of ordinary skill in the art expects that polyolefin morphology follows catalyst morphology when using Ziegler-Natta catalysts. That is, the more fractured catalyst particles that are made, the higher the expected incidence of fines and small particles in the final polyolefin product. Surprisingly, this relationship did not hold true for the inventive catalysts. There is no correlation between the observed morphology results of Table 2 and the amount of fines produced as demonstrated in Tables 4 and 5.

As will be understood by those of ordinary skill in the pertinent art based upon the teachings herein, numerous changes and modification may be made to the above-described and other embodiments of the invention without deviating from its scope as defined in the appended claims. Accordingly, this detailed description of preferred embodiments is to be taken in an illustrative as opposed to a limiting sense.

We claim:

1. A process for producing a Ziegler-Natta catalyst for the polymerization of olefins comprising the steps of:
   a. combining a spherical spray-cooled $MgCl_2$-xROH support, wherein x is in the range of from about 1.5 to about 6.0 and ROH is an alcohol or a mixture of alcohols where R is a linear, cyclic, or branched hydrocarbon unit with 1-10 carbon atoms, with a transition metal compound in a reactor at a temperature of between about −30° C. and +40° C. to form a mixture;
   b. heating the mixture in the reactor, when required, to a temperature of between about 30° C. to about 100° C.;
   c. concurrent with the heating in step (b), or following reaching the temperature of step (b), adding an internal electron donor to the mixture in the reactor;
   d. heating the resulting mixture to a temperature of at least 80° C. and less than 110° C. and holding the resulting mixture at that temperature for a time in the range from about 10 minutes to 2 hours to produce a pre-catalyst;
   e. cooling the mixture containing the pre-catalyst to room temperature (20° C.) and filtering the mixture containing the pre-catalyst to obtain the solid pre-catalyst component;
   f. extracting the pre-catalyst with a mixture of an organic solvent and a transition metal at a temperature of at least 100° C. for 1-5 hours to form a catalyst;
   g. cooling the catalyst to room temperature, washing the catalyst several times with a hydrocarbon solvent and drying the catalyst under vacuum and/or elevated temperature of 30-100° C.

2. The process of claim 1, wherein ROH is a mixture of at least two different alcohols, with R being a linear, cyclic or branched hydrocarbon unit with 1-10 carbon atoms.

3. The process of claim 1, wherein ROH is ethanol or a mixture of ethanol and a higher alcohol with R being a linear, cyclic or branched hydrocarbon unit with 3-10 carbon atoms.

4. The process of claim 1, wherein ROH is ethanol or a mixture of ethanol and a higher alcohol with R being a linear, cyclic or branched hydrocarbon unit with 4-10 carbon atoms.

5. The process of claim 1, wherein ROH is a mixture of ethanol and butanol, hexanol, heptanol or octanol.

6. The process of claim 1, wherein ROH is ethanol.

7. The process of claim 1, wherein x is a value in the range from about 2.5 to about 4.0.

8. The process of claim 1, wherein x is a value in the range from about 2.95 to about 3.35.

9. The process of claim 1, wherein, for step (a), the transition metal compound is $TiCl_4$ and ROH is ethanol or a mixture of ethanol and a higher alcohol with R being a linear, cyclic or branched hydrocarbon unit with 3-10 carbon atoms.

10. The process of claim 1, wherein, for step (a), the transition metal compound is $TiCl_4$ and ROH is ethanol.

11. The process of claim 1, wherein the extraction step (f) is accomplished using the Soxhlet extraction method.

12. The process of claim 1, wherein the reactor temperature for the combination of the $MgCl_2$-xROH and the transition metal compound is in the range from about −10° C. to +10° C.

13. The process of claim 1, wherein the transition metal used in step (f) is $TiCl_4$.

14. The process of claim 1, wherein the internal electron donor is one or more members selected from the group consisting of diesters, substituted cycloalkane 1,2-dicarboxylic acids, monoesters of substituted benzophenone 2-carboxylic acids, substituted benzophenone 3-carboxylic acids, non-substituted and substituted ($C_1$-$C_{10}$ alkyl)-1,3-propane diethers, derivatives of carboxylic acid, derivatives of phthalic acid and derivatives of succinates.

15. The process of claim 1, wherein the internal electron donor is one or more members selected from the group of di-isobutylphthalate (D-i-BP), di-n-butylphthalate (D-n-BP), diisooctylphthalate, di-2-ethyl, hexylphthalate, and diisononylphthalate.

16. The process of claim 1, wherein the mixture of step (a) is allowed to react for approximately 2 minutes to approximately 300 minutes before proceeding with the heating of step (b).

17. The process of claim 1, wherein the resulting mixture of step (d) is heated to a temperature from about 100° C. to about 105° C.

18. The process of claim 17, wherein the resultant mixture of step (d) is held at the temperature for about one hour to about two hours.

19. The process of claim 1, wherein the organic solvent of step (f) is an aliphatic or aromatic hydrocarbon.

20. The process of claim 1, wherein the organic solvent of step (f) is an aromatic hydrocarbon.

21. The process of claim 1, wherein the organic solvent of step (f) is ethylbenzene.

22. The process of claim 13, wherein the organic solvent is ethylbenzene and the volume ratio of $TiCl_4$ to ethylbenzene is about 30:70 and the extraction time is 1-5 hours at a temperature of at least 100° C.

23. The process of claim 13, wherein the organic solvent is ethylbenzene and the volume ratio of $TiCl_4$ to ethylbenzene is about 20:80 and the extraction time is 1-4 hours at 100-135° C.

24. The process of claim 13, wherein the organic solvent is ethylbenzene and the volume ratio of $TiCl_4$ to ethylbenzene is about 10:90 and the extraction time is 1-3 hours at 120-130° C.

25. The process of claim 1 wherein a portion of the ROH is removed from the $MgCl_2$ support by de-alcoholation prior to reacting with the transition metal compound.

26. The process of claim 1, wherein, for step (a), the molar ratio of Mg to the transition metal is between about 1:100 and about 1:5.

27. The process of claim 1, wherein, for step (a), the molar ratio of Mg to the transition metal is between about 1:50 and about 1:8.

28. The process of claim 1, wherein, for step (a), the molar ratio of Mg to the transition metal is between about 1:25 and about 1:9.

29. The process of claim 1, wherein the internal electron donor is di-isobutylphthalate (D-i-BP) or di-n-butylphthalate (D-n-BP) and the molar ratio of D-i-BP/Mg or D-n-BP/Mg is between about 0.12 to about 0.15.

30. A process for producing a catalyst for the polymerization of olefins comprising the steps of:
   a. combining a spherical spray-cooled $MgCl_2$-xEtOH support, wherein x is about 3.0 to about 3.3 and EtOH is ethanol, with $TiCl_4$ in a reactor at a temperature of between about −10° C. and +10° C. to form a mixture;
   b. heating the mixture in the reactor to a temperature of about 40° C.-90° C.;
   c. adding di-isobutylphthalate (D-i-BP) to the mixture in the reactor;
   d. heating the resulting mixture to a temperature in the range from about 100° C. to less than 110° C. and holding the resulting mixture at that temperature for about 1 hour to 2 hours to produce a pre-catalyst;
   e. cooling the mixture containing the pre-catalyst to room temperature (20° C.) and filtering the mixture containing the pre-catalyst to obtain the solid pre-catalyst component;
   f. extracting the pre-catalyst using Soxhlet extraction with a mixture of ethylbenzene and $TiCl_4$ at a temperature of 120-130° C. for 1-3 hours to form a catalyst;
   g. cooling the catalyst to room-temperature, washing the catalyst several times with a solvent containing hexane or heptane and drying the catalyst under vacuum and/or elevated temperature of 30-100° C.

31. A process for the polymerization of olefins of formula $CH_2$=$CHR^1$, in which $R^1$ is hydrogen or a hydrocarbon radical having 1-12 carbon atoms, carried out in the presence of a catalyst produced by the process of claim 1 or claim 30.

32. A catalyst produced by the process of either claim 1 or claim 30 and having a bulk polymerization activity for polypropylene of greater than 60 kg polypropylene/g-cat hour.

33. A process for producing a Ziegler-Natta catalyst for the polymerization of olefins comprising the steps of:
   a. combining a spherical spray-cooled $MgCl_2$-xROH support, wherein x is in the range of from about 1.5 to about 6.0 and ROH is an alcohol or a mixture of alcohols where R is a linear, cyclic, or branched hydrocarbon unit with 1-10 carbon atoms, with a transition metal compound in a reactor at a temperature of between about −30° C. and +40° C. to form a mixture;
   b. heating the mixture in the reactor, when required, to a temperature of between about 30° C. to about 70° C.;
   c. concurrent with the heating in step (b), or following reaching the temperature of step (b), adding an internal electron donor to the mixture in the reactor and holding the resulting mixture at that temperature for a time in the range from about 10 minutes to 1 hour;
   d. heating the resulting mixture to at least 80° C. and holding the resulting mixture at that temperature for a time in the range from about 10 minutes to 2 hours to produce a pre-catalyst;
   e. cooling the mixture containing the pre-catalyst to room temperature (20° C.) and filtering the mixture containing the pre-catalyst to obtain the solid pre-catalyst component;
   f. extracting the pre-catalyst with a mixture of an organic solvent and a transition metal at a temperature of at least 100° C. for 1-5 hours to form a catalyst;
   g. cooling the catalyst to room temperature, washing the catalyst with a hydrocarbon solvent several times and drying the catalyst under vacuum and/or elevated temperature of 30-100° C.

34. The process of claim 33, wherein x is in the range from about 2.95 to about 6.0.

* * * * *